United States Patent [19]

Gouttebessis et al.

[11] Patent Number: 4,926,920
[45] Date of Patent: May 22, 1990

[54] PNEUMATIC TIRE-THE CARCASS OF WHICH IS FORMED OF A REGENERATED CELLULOSE FIBER

[75] Inventors: Jacques Gouttebessis, Chanat-la-Mouteyre, France; Philippe Villaine, Dubendorf, Switzerland

[73] Assignee: Michelin Recherche et Technique S.A., Basel, Switzerland

[21] Appl. No.: 922,028

[22] Filed: Oct. 22, 1986

[30] Foreign Application Priority Data

Oct. 24, 1985 [FR] France ................. 85/16078

[51] Int. Cl.$^5$ .................. B60C 9/04; D02G 3/48
[52] U.S. Cl. ..................... 152/548; 152/556
[58] Field of Search ............... 152/451, 527, 548, 556; 57/902; 264/178 F, 187, 203, 207, 210.8, 211.14; 536/57, 69.76, 82; 428/393

[56] References Cited

U.S. PATENT DOCUMENTS

| 2,053,123 | 9/1936 | Alles | 152/13 |
| 2,147,736 | 2/1939 | Dreyfus | 154/2 |
| 3,442,315 | 5/1969 | Mirtain | 152/556 |
| 3,498,355 | 3/1970 | Sperberg | 152/556 |
| 4,464,323 | 8/1984 | O'Brien | 264/187 |
| 4,501,886 | 2/1985 | O'Brien | 536/57 |

FOREIGN PATENT DOCUMENTS

| 0103398 | 3/1984 | European Pat. Off. . |
| 2340344 | 9/1977 | France . |
| 0000309 | of 1911 | United Kingdom . |
| 0029246 | of 1911 | United Kingdom . |

Primary Examiner—Raymond Hoch
Attorney, Agent, or Firm—Brumbaugh, Graves, Donohue & Raymond

[57] ABSTRACT

A pneumatic tire has a carcass which is formed, at least in part, of a regenerated cellulose fiber. The fiber is formed of at least one filament having a base of cellulose and/or at least one cellulose derivative containing cellulose ester groups, at least a part of these ester groups being formate groups.

6 Claims, 1 Drawing Sheet

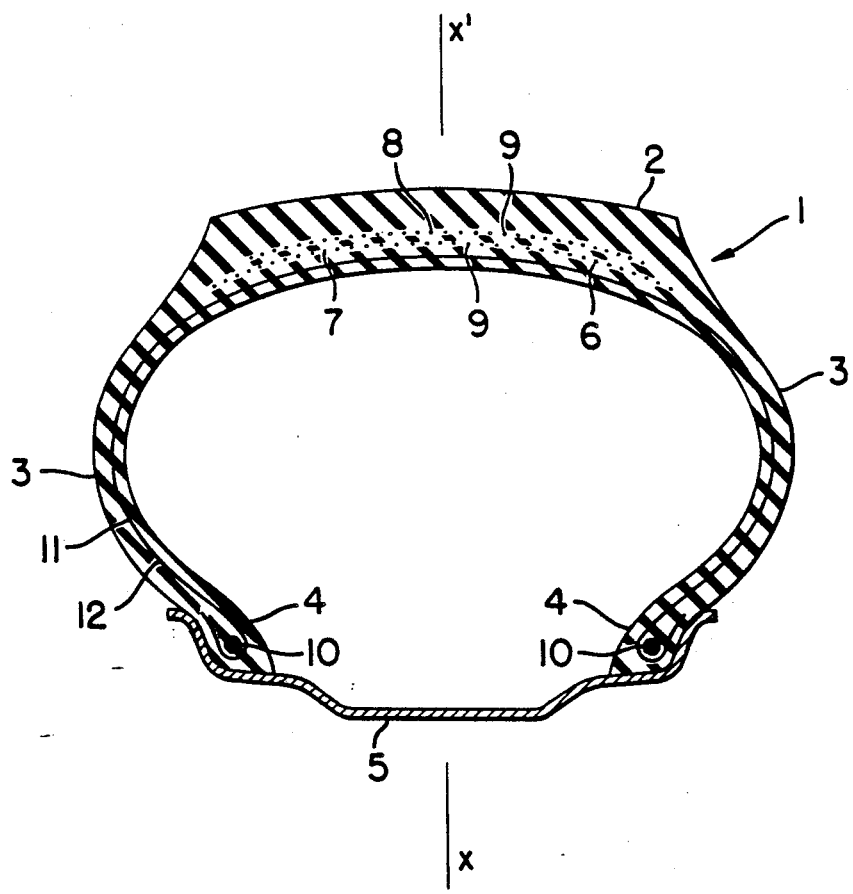

PNEUMATIC TIRE-THE CARCASSE OF WHICH IS FORMED OF A REGENERATED CELLULOSE FIBER

The present invention concerns pneumatic tires and, more particularly, the carcasses of pneumatic tires made with cellulose fibers.

International Patent Application No. PCT/CH85/00065 (corresponding to U.S. patent application Ser. No. 822,419, filed Dec. 19, 1985, now U.S. Pat. No. 4,839,113, the entire disclosure of which is hereby incorporated by reference herein) describes a regenerated cellulose fiber obtained in the following manner:

An anisotropic solution is prepared having a base of at least one cellulose derivative containing cellulose ester groups, at least a part of these ester groups being formate groups, the concentration of the cellulose derivative or of all the cellulose derivatives in the solution being at least equal to 10.2% by weight and the degree of polymerization DP of the cellulose in the cellulose derivative or derivatives being greater than 150 and less than 1500; this solution is prepared, for instance, by directly dissolving the cellulose by means of formic acid and orthophosphoric acid;

This solution is transformed in order to obtain a fiber, for instance by the so-called "with air space" (dry jet-wet) technique described, for instance, in U.S. Pat. No. 3,414,645;

The cellulose of this fiber is regenerated in such a manner that the degree of substitution DS of the cellulose by formate groups is zero or less than 2%.

This fiber is characterized by a high tenacity T and initial modulus $M_i$.

The applicants have discovered that the use of this regenerated cellulose fiber for the manufacture of a tire carcass unexpectedly makes it possible to decrease the rolling resistance of the tire.

Accordingly, the invention concerns a pneumatic tire comprising at least one carcass ply, said tire being characterized by the fact that said carcass ply is formed, at least in part, of a regenerated cellulose fiber, said fiber being formed of at least one filament having a base of cellulose and/or of at least one cellulose derivative containing cellulose ester groups, at least a part of these ester groups being formate groups, said fiber having the following properties:

(a) the degree of substitution DS of the cellulose by formate groups is zero or less than 2% and the degree of polymerization DP of the cellulose is greater than 150 and less than 1500;

(b) the degree of polymerization DP of the cellulose, the tenacity T and the initial modulus $M_i$ of the fiber verify the following relationships, T and $M_i$ being expressed in cN/tex:

for $150 < DP < 200$: $T > 20$ and $M_i > 1800$;
for $200 \leq DP < 300$: $T > 30$ and $M_i > 2000$;
for $300 \leq DP < 400$: $T > 40$ and $M_i > 2400$;
for $400 \leq DP < 1500$: $T > 60$ and $M_i > 2600$;

(c) each filament has a morphology such that it is formed, at least in part, by layers which are embedded in each other, these layers surrounding the axis of the filament, and such that in each layer the optical direction and the direction of crystallization vary pseudoperiodically along the axis of the filament.

The invention will be easily understood with the assistance of the following nonlimitative examples and the sole schematic figure of the drawing which covers these examples, this sole figure being a radial section through a pneumatic tire with a carcass ply which may or may not be in conformity with the invention.

The drawing shows a pneumatic tire 1. This tire 1 has a crown 2, two sidewalls 3 and two beads 4, the tire 1 being mounted on the rim 5. The crown 2 is reinforced by a reinforcement 6 consisting of two superposed plies 7, 8, each of said plies having reinforcement threads 9. Each of the beads 4 is reinforced by a bead ring 10. The tire 1 has a carcass ply 11 which extends from one bead 4 to the other, passing around the bead ring 10 of each of these beads 4 in known manner, said carcass being a radial carcass. The ply 7 is located below the ply 8 between said ply 8 and the carcass 11.

By way of example, the pneumatic tire 1 has the following properties:

Size: 135×13; for all the geometrical measurements which follow, this tire is mounted on the rim 5 and inflated to its normal pressure of use of 1.9 bar.

Reinforcement 6: each of the plies 7, 8 is formed of steel cables 9; each cable 9 has four steel wires of a diameter of 0.23 mm, these wires being twisted together with a pitch of 10 mm and wrapped with a pitch of 3.5 cm; in each ply the cables 9 form an angle of about 20° with the equatorial plane indicated by the line xx' of the drawing, the plies 7, 8 being crossed in known manner, that is to say the angles of the plies are opposite; the width of the plies 7 and 8, measured in radial section along the ply, is about 95 and 85 mm, respectively; the pitch of lay of the cables. 9 in the plies 7, 8 is 1 mm.

Carcass ply 11: this ply is formed of assemblies 2 of fibers which may either be in conformity with the invention or not in conformity with the invention. By way of example, in all cases each of these assemblies 12 is a strand formed of two multifilaments which have been previously twisted individually and then assembled with a twist of the same pitch as the previous twist but in opposite direction. It is to be noted that the two opposite twists need not have the same pitch.

Furthermore, in all cases the number of twisted strands 12 in the ply 11 is 11.9 per cm, said distance being measured in the equatorial plane xx', the strands 12 each having a radial orientation.

Two types of strands 12 are used in order in this way to obtain two tires 1, namely one strand of fibers in conformity with the invention marked 12A, and one strand, marked 12B, formed of fibers of rayon not in conformity with the invention.

The characteristics of the strands 12A, 12B and of the fibers constituting these strands are given in the following Table 1:

TABLE 1

| Properties | | Strand 12A | Strand 12B |
|---|---|---|---|
| 1. | Filaments | | |
| | Titer (tex) | 0.18 | 0.19 |
| | Tenacity (cN/tex) | 102 | 43.7 |
| | Initial modulus (cN/tex) | 3720 | 1110 |
| 2. | Untwisted Multifilaments | | |
| | Number of filaments | 1000 | 1000 |
| | Titer (tex) | 180 | 190 |
| | Tenacity (cN/tex) | 94 | 41.7 |
| | Initial modulus (cN/tex) | 2690 | 766 |
| 3. | Prior Twist of the Multifilaments | | |
| | (t/m) | 360 S | 360 S |
| 4. | Twist of the Strands | | |
| | (t/m) | 360 | 360 |

TABLE 1-continued

| Properties | Strand | |
|---|---|---|
| | 12A | 12B |
| | Z | Z |

Notes to Table 1: All the properties set forth for both the strand 12A and the strand 12B are determined by the methods described in the aforesaid international application No. PCT/CH85/00065 and U.S. application Ser. No. 822,419,

Twist

For the multifilaments and the strands, the twist is expressed in number of turns per meter (t/m). The letter S or Z which follows the value of the twist is commonly used in the textile industry and means that the twist is effected in the direction of that letter, a Z twist being, of course, in opposite direction to an S twist.

The multifilaments used to produce the strand 12A are prepared in the following manner, in accordance with the aforementioned International Patent Application No. PCT/CH85/00065 and U.S. application Ser. No. 822,419, now U.S. Pat. No. 4,839,113.

A mixture is formed of the following base materials:

Material (I): Cellulose material containing 98.8% by weight holocellulose (96% by weight α-cellulose and 2.8% by weight hemicelluloses);

Material (II): Formic acid containing 0.1% water, by weight, in accordance with Table 3, product 1, of said International Application No. PCT/CH85/00065 and U.S. application Ser. No. 822,419.

Material (III): Orthophosphoric acid containing 0.6% water, by weight, in accordance with Table 3, product 2, of said International Application No. PCT/CH85/00065 and U.S. application Ser. No. 822,419, now U.S. Pat. No. 4,839,113.

Upon preparation of the mixture one has the ratios:
$R_I = 16.00$; $R_{II} = 18.79$; $R_{III} = 64.45$;
$R_{er}$ (or $R_{wr}$) = $R_e$ (or $R_w$) = 0.76, the meaning of $R_I$, $R_{II}$, $R_{III}$, $R_{er}$ (or $R_{wr}$), $R_e$ (or $R_w$) being given in said International Application No. PCT/CH85/00065 (or U.S. application Ser. No. 822,419, now U.S. Pat. No. 4,839,113).

The amount of water present to form the mixture is zero or such that the ratio $$R_{wr} = \frac{P_w - P_{wr}}{P_I + P_{II} + P_{III} + P_w - P_{wr}}$$

is less than 15.0% and greater than −7.5%, $R_{wr}$ being expressed in percentage (%), $P_w$ being the weight of the water possibly present, $P_{wr}$ being the weight of water capable of possibly reacting with material (II) and/or material (III), $P_I$ being the weight of cellulose in material (I), $P_{II}$ being the weight of material (II) and $P_{III}$ being the weight of material (III);

(a) the ratios $R_I$, $R_{II}$, $R_{III}$ being defined by:

$$R_I = \frac{P_I}{P_I + P_{II} + P_{III} + P_w - P_{wr}},$$

$$R_{II} = \frac{P_{II}}{P_I + P_{II} + P_{III} + P_w - P_{wr}},$$

$$R_{III} = \frac{P_{III}}{P_I + P_{II} + P_{III} + P_w - P_{wr}},$$

the ratios $R_I$, $R_{II}$, $R_{III}$, $R_{wr}$, the sum of which $R_I + R_{II} + R_{III} + R_{wr}$ is equal by definition to 100%, will verify the following relationships the values of which are expressed in %:

if $R_{wr}$ verifies the relationship:
$12.5 \leq R_{wr} < 15.0$
one has the relationship:
$10.0 \leq R_I \leq 14.5$; $2.0 \leq R_{II} \leq 10.0$
with the relationship: $R_{II} \leq 0.89 \, R_I - 2.89$;
if $R_{wr}$ verifies the relationship:
$10.0 \leq R_{wr} < 12.5$
one has the relationships;
$10.0 \leq R_I \leq 19.5$; $2.0 \leq R_{II} \leq 17.0$
with the relationship: $R_{II} \leq 1.78 \, R_I - 8.78$
if $R_I$ verifies the relationship: $R_I < 14.5$ or with the relationship:
$R_{II} \leq -1.40 \, R_I + 37.30$
if $R_I$ verifies the relationship: $R_I \geq 14.5$;
if $R_{wr}$ verifies the relationship:
$7.5 \leq R_{wr} < 10.0$
one has the relationships:
$10.0 \leq R_I \leq 31.0$; $2.0 \leq R_{II} \leq 23.0$
with the relationship: $R_{II} \leq 4.40 \, R_I - 32.00$
if $R_I$ verifies the relationship $R_I \leq 12.5$, or with the relationship:
$R_{II} \leq -1.19 \, R_I + 41.50$
if $R_I$ verifies the relationship: $R_I \geq 15.5$;
if $R_{wr}$ verifies the relationship:
$5.0 \leq R_{wr} < 7.5$
one has the relationships:
$10.0 \leq R_I \leq 37.0$; $2.0 \leq R_{II} \leq 27.5$
with the relationship: $R_{II} \leq 4.17 \, R_I - 26.67$ if $R_I$ verifies the relationship: $R_I \leq 13.0$, or with the relationship:
$R_{II} \leq -01.14 \, R_I + 49.14$
if $R_I$ verifies the relationship: $R_I \geq 19.0$;
if $R_{wr}$ verifies the relationship:
$2.5 \leq R_{wr} < 5.0$
one has the relationships:
$10.0 \leq R_I \leq 37.0$; $2.0 \leq R_{II} \leq 36.5$
with the relationship: $R_{II} \leq 4.63 \, R_I - 28.25$
if $R_I$ verifies the relationship: $R_I \leq 14.0$, or with the relationship:
$R_{II} \leq -1.23 \, R_I + 55.60$
if $R_I$ verifies the relationship: $R_I \geq 15.5$;
if $R_{wr}$ verifies the relationship:
$-2.5 < R_{wr} < 2.5$ one has the relationship:
$10.0 \leq R_I \leq 38.0$; $2.0 \leq R_{II} \leq 40.0$
with the relationship: $R_{II} \leq 2.80 \, R_I + 5.00$ if $R_I$ verifies the relationship: $R_I \leq 12.5$, or with the relationship:
$R_{II} \leq -1.14 \, R_I + 62.14$ if $R_I$ verifies the relationship: $R_I \geq 12.5$;
if $R_{wr}$ verifies the relationship:
$-5.0 < R_{wr} \leq -2.5$ one has the relationships:
$10.0 \leq R_I \leq 35.0$; $2.0 \leq R_{II} \leq 45.0$
with the relationship: $R_{II} \leq -1.30 \, R_I + 64.50$;
if $R_{wr}$ verifies the relationship:
$-7.5 < R_{wr} \leq -5.0$ one has the relationships:
$10.00 \leq R_I \leq 32.0$; $2.0 \leq R_{II} \leq 36.0$ with the relationship: $R_{II} \leq 4.00 \, R_I - 22.00$
if $R_I$ verifies the relationship: $R_I \leq 14.5$;

At the end of 90 minutes in a thermostatically controlled mixer the temperature of the products within the mixer being maintained at 25? C., said mixer being provided with an anchor agitator and operating under vacuum, a solution is obtained having the following composition: cellulose derivative (cellulose formate): 19.05% by weight; organic acid (formic acid): 13.79% by weight; inorganic acid (orthophosphoric acid): 64.45% by weight; water: 2.71% by weight. The solution is anisotropic.

The solution is introduced directly from the dissolving reactor into the spinning pump.

From the spinning pump the solution is extruded through a die having 200 orifices, each of a diameter of 0.005 cm. The die is located 0.8 cm from the coagulation bath which consists of acetone at $-15°$ C. The fiber has a speed on the drive device of 54 meters per minute which corresponds to a stretch factor upon spinning of 3.6. The reel obtained is washed in water. There is thus obtained a fiber (spun yarn) formed of 200 continuous filaments.

Five spun yarns obtained in this manner are then assembled at the entrance into a regeneration station. In this station, the new multifilament is regenerated continuously for 15 seconds by means of an aqueous solution containing 1% by weight of sodium hydroxide. The regenerated multifilament then passes into a neutral washing booth in which it is washed for 25 seconds with water. Finally, the multifilament passes for 10 seconds over drums heated to 150° C. in order to dry it before it is wound up. There is thus obtained a regenerated multifilament formed of 1000 filaments, the fiber being formed by this multifilament.

This regenerated fiber is characterized by a degree of polymerization DP equal to 410 and by a degree of substitution DS of less than 0.5%, DP and DS being determined in accordance with said International Patent Application No. PCT/CH85/00065 and U.S. application Ser. No. 822,419, now U.S. Pat. No. 4,839,113. as follows:

Degree of polymerization DP: The inherent viscosity Iv of the cellulose material is determined in accord with Swiss Standard SNV 195 598 of 1970, but at different concentrations, varying between 0.5 and 0.05 g/dl.

The inherent viscosity is determined by the equation $$IV = \frac{1}{C} \operatorname{Ln} \frac{t}{t_o}$$

in which C represents the concentration of dry cellulose material, "t" represents the flow time of the dilute polymer solution, $t_o$ represents the flow time of the pure solvent in an Ubbelohde-type viscosimeter and Ln represents the Napierian logarithm, the measurements being effected at 20? C.

The intrinsic viscosity $[\eta]$ is obtained by extrapolating the inherent viscosity IV to zero concentration.

The weight average molecular weight $M_w$ is given by the Mark-Houwink equation: $[\eta] = KM_w^\alpha$ where the constants K and $\alpha$ are $K = 5.31 \times 10^{-4}$ and $\alpha = 0.78$, these constants corresponding to the solvent system used for the determination of the inherent viscosity.

These value are given by L. Valtasaari in Tappi 48, 627 (1965).

The degree of polymerization (DP) is defined by the formula $$DP = \frac{M_w}{162}$$

in which 162 is the molecular weight of the elementary unit of the cellulose.

Degree of substitution (DS) of the cellulose in solution in the form of cellulose derivative is determined as follows: The solution is frozen in liquid nitrogen, the solid product obtained is mixed with dry ice and crushed so as to obtain a powder which is mixed with acetone, which gives a precipitate which is filtered and extracted with acetone, using a Soxlhet extractor. The remaining powder is dried in air at 70? C. for at least 30 minutes.

400 mg of derivative of the cellulose thus obtained is weighed out accurately and introduced into an Erlenmeyer containing 70 ml of water and 4 ml of normal sodium hydroxide (1N NaOH). It is refluxed at 100? C. for one-half hour under nitrogen and the cellulose of the cellulose derivative is thus regenerated. After cooling, the excess sodium hydroxide is back-titrated with a decinormal solution of hydrochloric acid (0.1 N HCl).

The total DS obtained by this method gives the total percentage of alcohol groups of the cellulose which have been esterified, that is to say DS = 100% when the three alcohol functions of the elementary unit of the cellulose are esterified.

When all the ester groups of this cellulose derivative are formate groups, the DS thus determined gives directly the percentage of alcohol groups in the cellulose which have been transformed into formate groups. When the cellulose derivative contains several ester groups, for instance formate groups and acetate groups, in order to distinguish the degree of substitution relative to each organic acid one proceeds in the following manner, after having determined the total DS in the manner previously described. The neutral solution coming from the determination of the total DS is made basic (pH = 11) so as to precipitate the cellulose thus regenerated. This cellulose is filtered. The filtrate is concentrated by evaporation of the water and then acidified with hydrochloric acid. This residue is weighed and then analyzed by gaseous-phase chromatography in order to determine the content of organic acid other than formic acid therein. By way of example, in the case of acetic acid, the conditions for gaseous phase chromatographic analysis are as follows: glass column: length 1.5 m, inside diameter 2 mm; packing: Poropak Q; apparatus: Pye Unicam; temperature of the injector: 250° C.; temperature of the furnace: 140° C.; temperature of the FID detector: 220° C. One thus determines the DS relative to the organic acid other than formic acid and the DS relative to the formic acid is then determined by calculation, based on a knowledge of the total DS. The morphology of this fiber is the same as the morphology of the fibers of the invention described in the said International Patent Application No. PCT/CH85/00065 and U.S. application Ser. No. 822,419, now U.S. Pat. No. 4,839,113, this morphology being therefore such that each filament of this regenerated fiber is formed, at least in part, by layers embedded in each other, these layers surrounding the axis of the filament, and such that in each layer the optical direction and the direction of crystallization vary pseudoperiodically along the axis of the filament. The mechanical properties of the fiber and of the filaments which constitute it are given in Table 1 above.

The rolling resistance for each of the two tires 1 is determined in the following manner.

The tire 1, mounted on its rim 5, inflated to its normal pressure of use and placed under its normal load of use is driven freely in rotation by a flywheel. The conditions of this measurement are as follows:
  normal temperature: (about 20° C.);
  speed of rolling: 60 km/hour, after heat stabilization;
  circumference of the flywheel: 8.50 m;
  inflation pressure of the tire: 1.9 bar;
  load on the tire: 280 decanewtons.

The rolling resistance X of the tire 1 corresponds to the force upon rolling in the area of contact of the tire 1 with the flywheel.

The rolling resistance X is calculated by the formula:

$$X = F \times \frac{R + R_c}{R}$$

F being the force measured on the axis of the wheel which has the rim 5, R being the radius of the flywheel and $R_C$ being the crushed radius of the tire 1 on the flywheel.

The rolling resistance index $I_r$ is given by the formula $I_r = X/Z$, Z being the load on the tire (280 decanewtons).

The rolling resistance index $I_r$ is shown in Table 2 below, $I_r$ being expressed in decanewtons per ton (daN/t).

TABLE 2

|  | Strand Used for the Tire | |
| --- | --- | --- |
|  | 12A | 12B |
| Rolling resistance index $I_r$ (daN/t) | 13.02 | 13.33 |

It is therefore unexpectedly noted that, as compared with a rayon carcass, the carcass of the invention employing the strand 12A results in less resistance to rolling, which makes it possible to decrease the energy necessary for the rolling and to decrease the heating of the tire 1 and therefore to increase its life.

All the properties of regenerated fibers of the invention which have been described in said International Patent Application No. PCT/CH85/00065 and U.S. application Ser. No. 822,419, now U.S. Pat. No. 4,839,113, can be used in the invention of the present application.

For example, one may have the following properties for the fibers:

The sonic modulus $M_s$ is in accord with the relationship $M_s > 3000$ cN/tex.

In particular, the sonic modulus $M_s$ of the fiber used to produce the strand 12A is 3610 cN/tex.

The index of orientation I.O. is in accord with the following relationship:

I.O. > 95.5%.

In particular, the index of orientation I.O. of the fiber used to produce the strand 12A is 97.4%.

The fiber is without any drawing, other than that resulting from its shaping.

The degree of polymerization DP of the cellulose which it contains is at least equal to 200 and at most equal to 1200.

Of course, the invention is not limited to the embodiments which have been described above and thus the pneumatic tire of the invention may, for instance, have more than one carcass ply.

What is claimed is:

1. A pneumatic tire comprising at least one carcass ply, said tire being characterized by the fact that said carcass ply is formed, at least in part, of a regenerated cellulose fiber, said fiber being formed of at least one filament having a base material selected from the group consisting of cellulose and cellulose derivatives containing cellulose ester groups, at least a part of these ester groups being formate groups, said fiber having the following properties:
   (a) the degree of substitution DS of the cellulose by formate groups is less than 2% and the degree of polymerization DP of the cellulose is greater than 150 and less than 1200 and the degree of substitution DS of the cellulose by ester groups other than formate in zero or less than 1.5%;
   (b) the degree of polymerization DP of the cellulose, the tenacity T and the initial modulus $M_i$ of the fiber verify the following relationships, T and $M_i$ being expressed in cN/tex:
      for $150 < DP < 200$: $T > 20$ and $M_i > 1800$;
      for $200 \leq DP < 300$: $T > 30$ and $M_i > 2000$;
      for $300 \leq DP < 400$: $T > 40$ and $M_i > 2400$;
      for $400 \leq DP < 1200$: $T > 60$ and $M_i > 2600$; and
   (c) each filament has a morphology such that it is formed, at least in part, by layers which are embedded in each other, these layers surrounding the axis of the filament, and such that in each layer the optical direction and the direction of crystallization vary pseudoperiodically along the axis of the filament.

2. A pneumatic tire according to claim 1, characterized by the fact that the sonic modulus $M_s$ of the fiber verifies the relationship $M_s > 3000$ cN/tex.

3. A pneumatic tire according to claim 1, characterized by the fact that the index of orientation I.O. of the fiber verifies the relationship I.O. > 95.5%.

4. A pneumatic tire according to claim 1, characterized by the fact that the fiber is formed without drawing, other than that resulting from its shaping.

5. A pneumatic tire according to claim 1, characterized by the fact that in the fiber the degree of polymerization DP of the cellulose which it contains is at least equal to 200 and at most equal to 1200.

6. A pneumatic tire according to claim 1, characterized by the fact that the carcass ply is a radial ply.

* * * * *

UNITED STATES PATENT AND TRADEMARK OFFICE
CERTIFICATE OF CORRECTION

PATENT NO. : 4,926,920

DATED : May 22, 1990

INVENTOR(S) : Gouttebessis et al.

It is certified that error appears in the above-identified patent and that said Letters Patent is hereby corrected as shown below:

Col. 2, line 32, "assemblies 2" should read --assemblies 12--; last line, "360   360" should read --360 Z   360 Z--. Col. 3, delete lines 1-5; line 46, change the period to --as follows:--. Col. 4, line 11, "relationship:" should read --relationships:--; line 51, "relationship:" should read --relationships:--; last line, "25? C." should read --25° C.--. Col. 5, line 41, "Iv" should read --IV--; line 56, "20? C." should read --20° C.--; line 59, "$M_w$" should read --$\overline{M}_w$--; line 60, "$KM_w\alpha$" should read --$K\overline{M}^\alpha_w$--. Col. 6, line 1, "$M_w$" should read --$\overline{M}_w$--; line 15, "70? C." should read --70° C.--; line 20, "100? C." should read --100° C.--. Col. 8, line 48, "Ms" should read --$M_s$--.

Signed and Sealed this

Third Day of September, 1991

*Attest:*

HARRY F. MANBECK, JR.

*Attesting Officer*   *Commissioner of Patents and Trademarks*